United States Patent
Chuang et al.

(10) Patent No.: US 7,475,100 B2
(45) Date of Patent: Jan. 6, 2009

(54) CALCULATING DEVICE CAPABLE OF DISPLAYING CONSTANTS AND METHOD THEREOF

(75) Inventors: Chia Ting Chuang, Taipei (TW); Pei-Chih Chen, Taipei (TW)

(73) Assignee: Kinpo Electronics, Inc., Taipei (TW)

( * ) Notice: Subject to any disclaimer, the term of this patent is extended or adjusted under 35 U.S.C. 154(b) by 639 days.

(21) Appl. No.: 10/372,767

(22) Filed: Feb. 26, 2003

(65) Prior Publication Data

US 2004/0167948 A1     Aug. 26, 2004

(51) Int. Cl.
 *G06F 3/00* (2006.01)
(52) U.S. Cl. ...................... 708/160
(58) Field of Classification Search ............... 708/160
See application file for complete search history.

(56) References Cited

U.S. PATENT DOCUMENTS

| | | | |
|---|---|---|---|
| 4,852,057 A * | 7/1989 | Patton | 708/136 |
| 6,874,005 B2 * | 3/2005 | Fortenberry et al. | 708/130 |
| 2002/0183090 A1 * | 12/2002 | Ho et al. | 455/556 |
| 2003/0012411 A1 * | 1/2003 | Sjostrom et al. | 382/109 |

FOREIGN PATENT DOCUMENTS

JP         10091312 A  *  4/1998

* cited by examiner

*Primary Examiner*—Tan V Mai
(74) *Attorney, Agent, or Firm*—Rabin & Berdo, PC

(57) ABSTRACT

A calculating device capable of displaying constants and the method thereof are proposed. A key determination unit is provided in a calculator to determine the function of the pressed key of an input unit. A constant unit database is provided for storing constant data. A constant execution unit is provided to read out the content of the constant unit database according to the determination result of the key determination unit. An output unit is also provided to display the value, unit, symbol and item number of a constant. During operation, a user can directly input the item number of a constant in a constant menu frame. Or after a user switches the page of the constant menu frame to find out a desired constant, he can then directly input the constant to display the value, unit, symbol and item number of the constant.

5 Claims, 4 Drawing Sheets

CALCULATING DEVICE CAPABLE OF DISPLAYING CONSTANTS AND METHOD THEREOF

FIELD OF THE INVENTION

The present invention relates to a calculating device capable of displaying constants and the method thereof and, more particularly, to a calculating device (e.g., a common calculator, an engineering calculator or a calculator on a PDA, a mobile phone or an electronic translator), whereby the value, unit and symbol of a constant can be displayed by directly inputting the item number of the constant or by paging through for inquiry.

BACKGROUND OF THE INVENTION

Because of the requirement in calculation, there have been calculators having common physical constants or physical astronomical constants built therein. Users can quickly call the value of a physical constant or a physical astronomical constant when performing calculation to save the time of looking up the physical constant or the physical astronomical constant.

In a calculator having physical constants or physical astronomical constants built therein, when a user wants to call the value of a constant, he must first input an item number of the constant stored in the calculator and then press an execution key (CONST key) for displaying the value of the constant on the screen of the calculator.

FIG. 1 shows an operation flowchart for inputting of a constant, which comprises the following steps:

Step 41: An item number of the constant is inputted;

Step 42: Whether the input of the item number is finished is determined. If the answer is yes, Step 43 is jumped to; otherwise, Step 41 is jumped back to;

Step 43: Whether the CONST key is pressed is determined. If the answer is yes, Step 44 is jumped to; otherwise, Step 46 is jumped to;

Step 44: Whether the inputted item number exceeds 136 (the total number of constants stored in the calculator) is determined. If the answer is yes, Step 47 is jumped to; otherwise, Step 45 is jumped to;

Step 45: The value of the constant is displayed;

Step 46: An arithmetic/logic unit is entered;

Step 47: The calculator displays an "ERROR" message.

For instance, if the item number of the speed of light in vacuum c in a calculator is 1, a user needs to first input 1 and then press the CONST key when he wants to call out the const of c. The value of c 299792458 will then be displayed on the screen of the calculator.

In the above input process, it is necessary for the user to know the item number of a constant in the calculator in advance. Usually, the item number of a constant can be looked up in an operation manual of the calculator or an index card attached. Therefore, the user needs to look up the operation manual or the index card when inputting a constant. The process is troublesome. Moreover, the calculator can only display the value or the representative symbol (e.g., c for the speed of light in vacuum) of a constant, but cannot display the unit of the constant or the real value of the constant in the calculator. Furthermore, if the operation manual or index card is lost, the user cannot accurately input constants.

Accordingly, the conventional calculator has inconvenience and drawbacks in the practical usage of constant input. The present invention aims to propose a calculating device capable of displaying constants and the method thereof to resolve the problems in the prior art.

SUMMARY OF THE INVENTION

The primary object of the present invention is to provide a calculating device capable of displaying constants and the method thereof, whereby a user can directly input an item number of a constant or switch a constant menu frame to finally output the value, unit and symbol of the constant.

To achieve the above object, the present invention provides a calculating device capable of displaying constants. The calculating device operates in a calculator, performs input with an input unit and displays the calculation result on an output unit. The calculating device comprises a key determination unit, a constant unit database, an arithmetic/logic unit and a constant execution unit. The key determination unit is used for determining the pressed key of the input unit. The constant unit database is used for storing constant data. The constant execution unit is electrically connected to the key determination unit and the constant unit database. The constant execution unit reads out the content of the constant unit database according to the determination result of the key determination unit. The arithmetic/logic unit performs the required calculation.

To achieve the above object, the present invention also provides a calculation method-capable of displaying constants, which comprises the steps of: (a) displaying a constant menu frame; (b) determining whether there is an item number of a constant directly inputted, jumping to a page in the constant menu frame corresponding to the item number if the answer is yes; switching the page of said constant menu frame otherwise; and (c) inputting data of the constant menu frame to display the content of the constant data.

To achieve the above object, the present invention also provides a recording medium, which stores a software procedure capable of displaying constants. The software procedure comprises a first procedure code for accepting an inputted key of the input unit, a second procedure code for determining the function of the inputted key of the input unit, a third procedure code for reading the constant content of the constant unit database and a fourth procedure code for processing, outputting and displaying the constant by the constant execution unit.

The various objects and advantages of the present invention will be more readily understood from the following detailed description when read in conjunction with the appended drawing, in which:

DETAILED DESCRIPTION OF THE PREFERRED EMBODIMENTS

Figure 1:
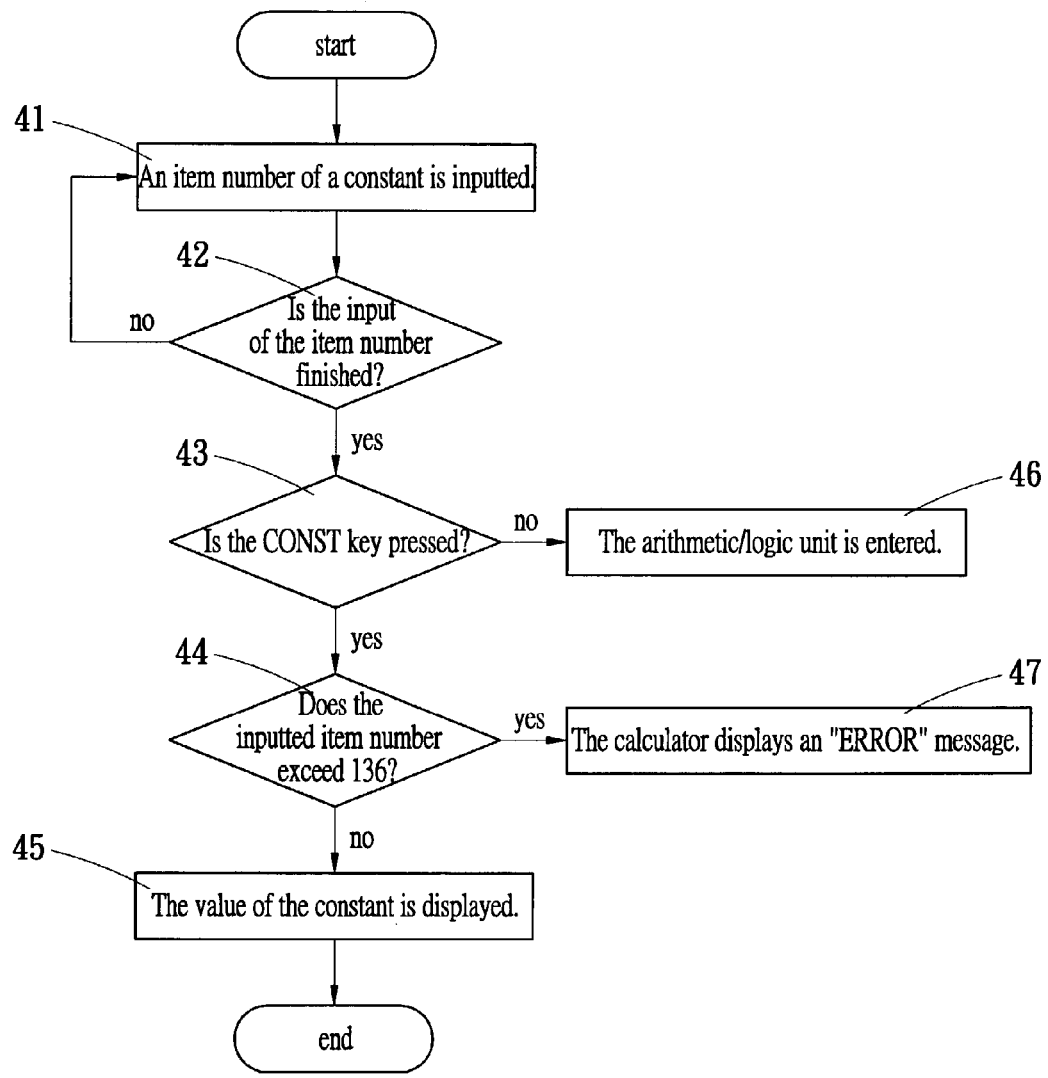
FIG. 1 is an operation flowchart of constant input in the prior art.
Figure 2:
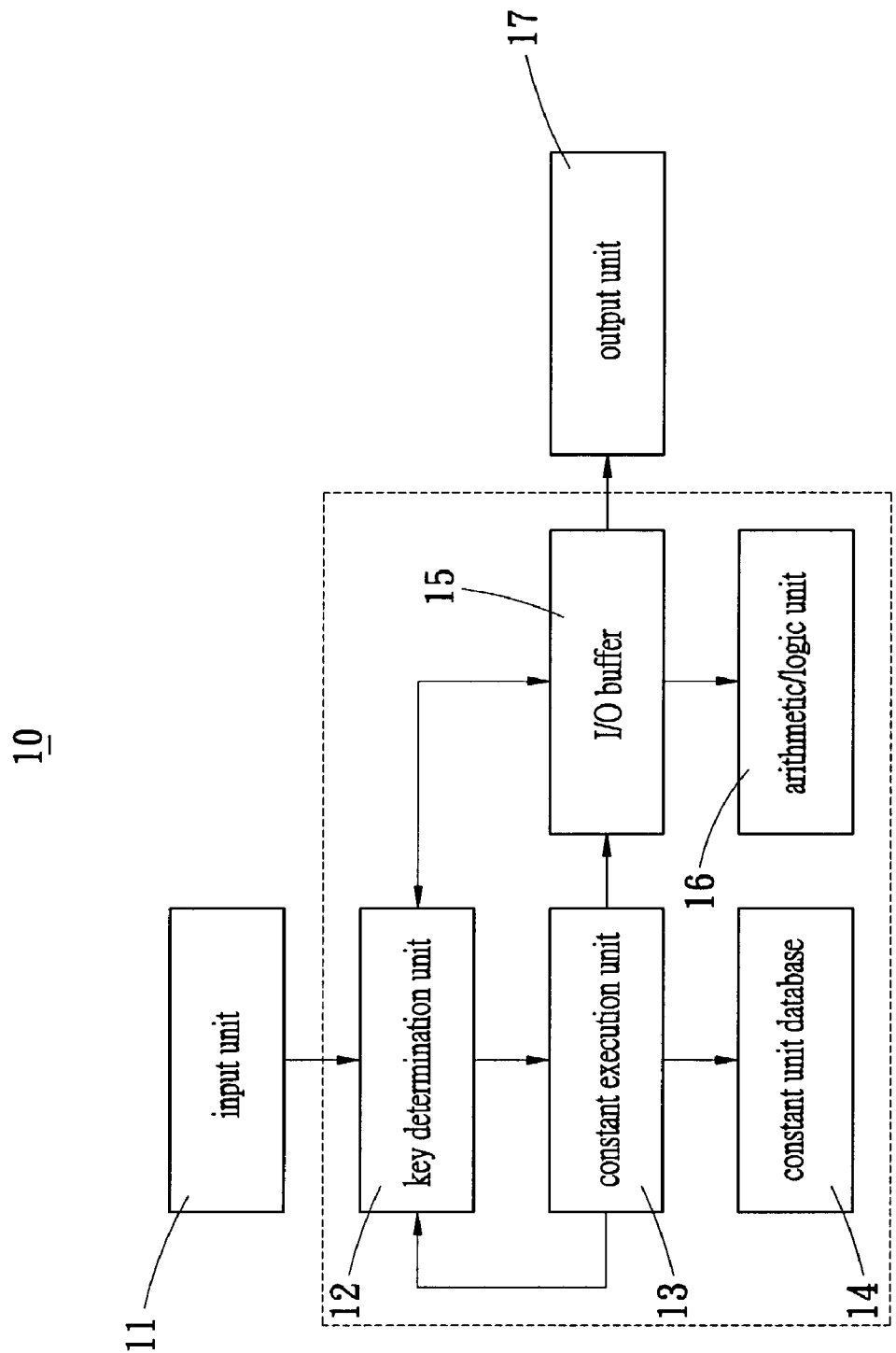
FIG. 2 is a system block diagram of a calculating device of the present invention.

As shown in FIG. 2, a calculating device of the present invention operates in a calculator 10, performs input with an input unit 11 and displays the calculation result on an output unit 17. The calculating device comprises a key determination unit 12, a constant execution unit 13, a constant unit database 14, an I/O buffer 15 and an arithmetic/logic unit 16.

The input unit 11 comprises several keys arranged on the calculator 10 for input operation. The keys at least include numeric keys, symbol keys, keys for the four fundamental operations of arithmetic (+, −, × and ÷) and an execution key for calling the constant function (briefly termed as the CONST key below). The key determination unit 13 is used to determine the function of the pressed key of the input unit 11. The constant execution unit 13 is electrically connected to the key determination unit 12, and executes the function of constant call according to the determination result of the key determination unit 12. The constant unit database 14 is electrically connected to the constant execution unit 13, and is used for storing values, symbols, units and item numbers in the calculator 10 of common constants (including physical constants and physical astronomical constants). The I/O buffer 15 is electrically connected to the key determination unit 12 and the constant execution unit 13, and provides temporary storage of numerical data in the operation process for the calculator 10. The arithmetic/logic unit 16 is electrically connected to the I/O buffer 15, and is used to calculate the inputted expression of the input unit 11. The output unit 17 is electrically connected to the I/O buffer 15, and is used to display inputted data, symbol and calculation results during the operation process with a liquid crystal display.

Figure 3:
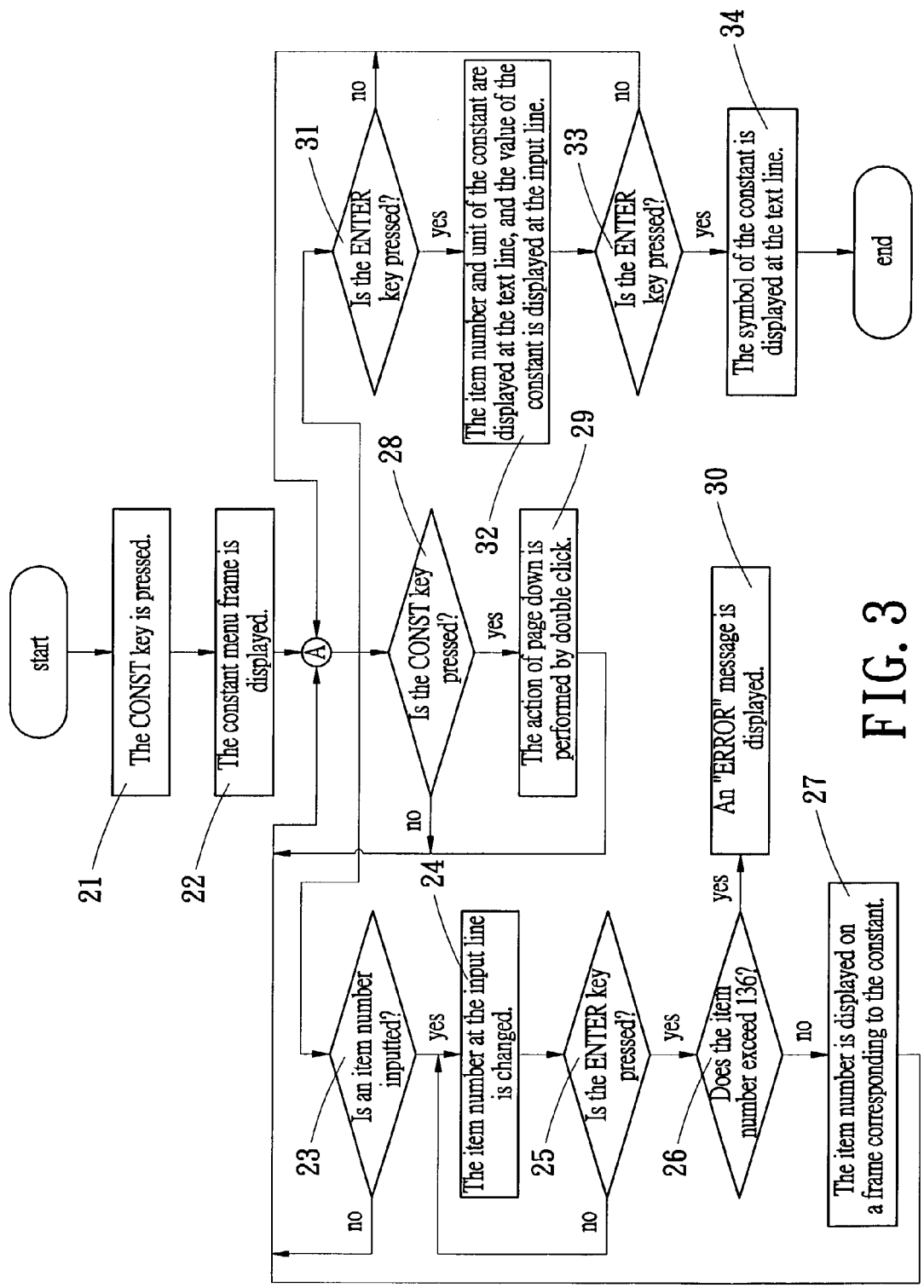
FIG. 3 is an operation flowchart of constant input of the present invention.

FIG. 3 shows an operation flowchart of constant input of the present invention, which comprises the following steps:

Step 21: The CONST key of the input unit 11 is pressed.
Step 22: The constant menu frame is displayed on the output unit 17 (branching to Step 23, Step 28 and Step 31 at a point A).
Step 23: Whether an item number of a constant is inputted is determined. If the answer is yes, Step 24 is jumped to; otherwise, Point A is jumped back to.
Step 24: The item number at the input line is changed. A user can change the inputted item number through a left/right shift key of the input unit 11.
Step 25: Whether the ENTER key of the input unit 11 is pressed is determined. If the answer is yes, Step 26 is jumped to; otherwise, Step 24 is jumped back to.
Step 26: Whether the item number exceeds 136 (the total number of constants stored in the calculator) is determined. If the answer is yes, Step 30 is jumped to; otherwise, Step 27 is jumped to.
Step 27: The item number is displayed on a frame corresponding to the constant.
Step 28: Whether the CONST key is pressed is determined. If the answer is yes, Step 29 is jumped to; otherwise, Point A is jumped back to.
Step 29: The action of page down is performed by double click to display a frame of item numbers corresponding to constants on the next page.
Step 30: An "ERROR" message is displayed on the output unit 17.
Step 31: Whether the ENTER key is pressed is determined. If the answer is yes, Step 32 is jumped to; otherwise, Point A is jumped back to.
Step 32: The item number and unit of the constant are displayed at the text line of the output unit 17, and the value of the constant is displayed at the input line of the output unit 17.
Step 33: Whether the ENTER key is pressed is determined. If the answer is yes, Step 34 is jumped to; otherwise, Point A is jumped back to.
Step 34: The symbol of the constant is displayed at the text line.

Figure 4:
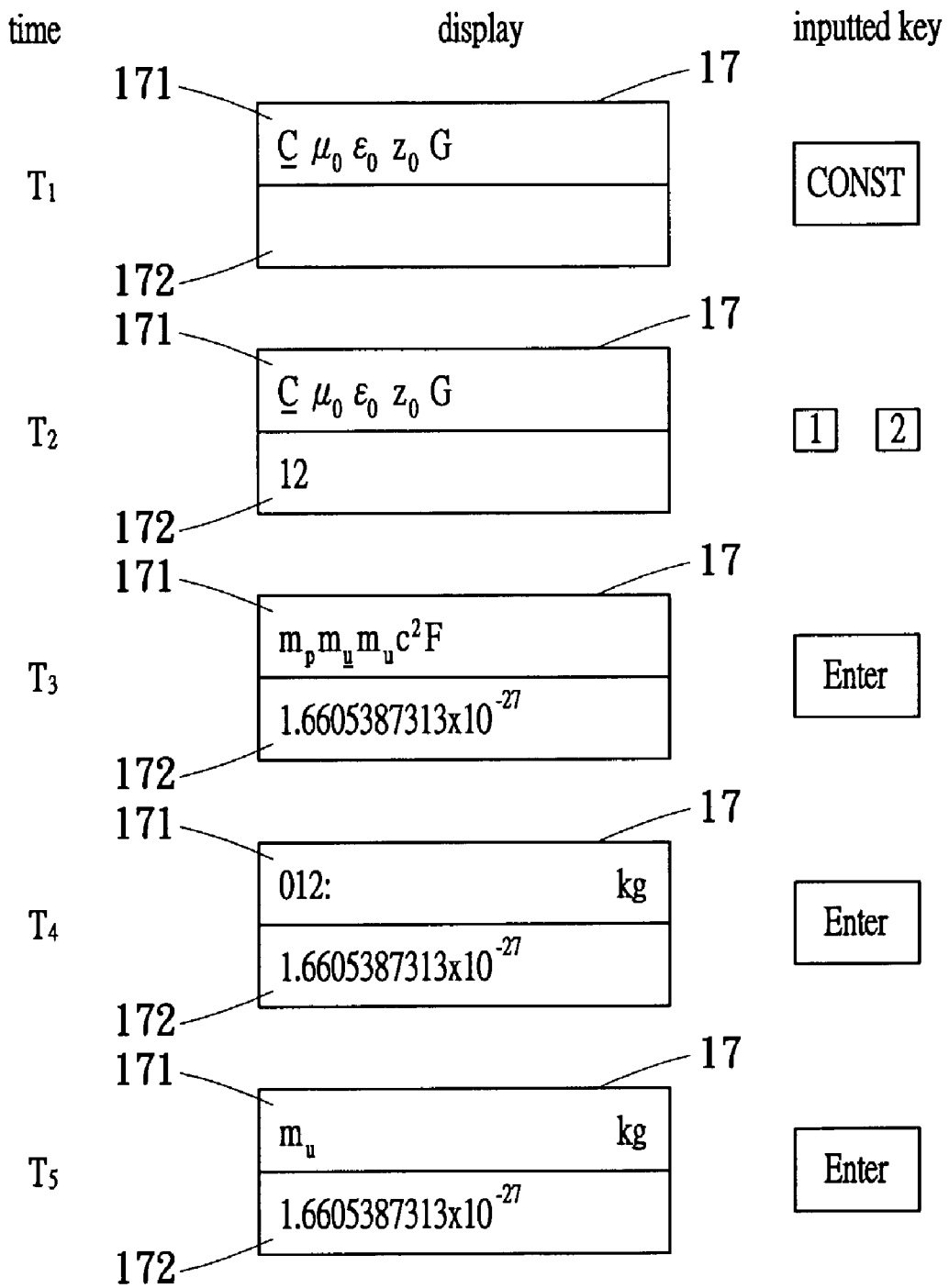
FIG. 4 is a diagram showing how an output unit of the present invention displays the process of constant input.

In order to more clearly illustrate the operation flowchart of FIG. 3, FIG. 4 shows how the output unit of the present invention displays the process of constant input. The output unit 17 is a liquid crystal display capable of displaying an upper text line 171 and a lower input line 172. At time T1 when the CONST key of the input unit 11 is pressed, a constant menu frame will be displayed at the text line 171, starting from the position of the item number 1 (i.e., the position of the constant symbol c with an underline). At time T2 when the numeric keys 1 and 2 of the input unit 11 are pressed, the number 12 will be displayed at the input line 172. At time T3 when the ENTER key of the input unit 11 is pressed, a frame of the item number 12 (i.e., the constant mu with an underline) corresponding to the constant will be displayed at the text line 171, and the value $1.6605387313 \times 10^{-27}$ of the constant mu will be displayed at the input line 172. At time T4 when the ENTER key of the input unit 11 is pressed again, the item number 12 and unit kg of the constant mu will be displayed at the text line 171. At time T5 when the ENTER key of the input unit 11 is pressed again, the constant symbol of the item number 12 will be directly displayed at the text line 171.

After the CONST key of the calculating device of the present invention is pressed, constant data are displayed with a menu frame. A user can directly input the item number of a constant to immediately jump to the position of the desired constant, and then click the ENTER key to display the item number, unit, value and symbol of the constant in switching way. Or when the user does not know the item number of a constant, he can double click the CONST key to switch to the page having the desired constant, use the left/right shift keys to move to the position of the desired constant, and then click the ENTER key to display the item number, unit, value and symbol of the constant in switching way.

The above steps of displaying constants of the present invention can also be written in a software procedure and then recorded in a recording medium. The software procedure comprises a first procedure code for accepting an inputted key of the input unit, a second procedure code for determining the function of the inputted key of the input unit, a third procedure code for reading the constant content of the constant unit database and a fourth procedure code for processing, outputting and displaying the constant by the constant execution unit.

To sum up, the calculating device capable of displaying constants and the method thereof of the present invention have the following effects:

(1) Even if the operation manual of a calculator is lost and a user does not know the item number of a constant, he can double click the CONST key to switch the displayed page for finding out the desired constant during the switching process.
(2) The cost of an index card for finding the corresponding item numbers of constants can be saved.
(3) The operation efficiency of a calculator can be enhanced by decreasing the number of times the operation manual of the calculator is looked up.
(4) The item numbers, values, units and symbols of constants can be displayed to help a user with memorization of constants, hence improving the learning curve of the user.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A calculating method capable of displaying constants, comprising the steps of:
   (a) pressing an execution key;
   (b) displaying a constant menu frame;
   (c) determining whether there is an item number of a constant directly inputted,
   (d) if the number is inputted, jumping to a page in the constant menu frame corresponding to the item number;
   (e) if the number is not inputted, switching the page of said constant menu frame; and
   (f) displaying content of said constant by pressing an ENTER key one or more times.

2. The calculating method capable of displaying constants as claimed in claim 1, wherein said constant menu frame displays a constant symbol.

3. The calculating method capable of displaying constants as claimed in claim 2, wherein the current position of said constant symbol is marked by an underline.

4. The calculating method capable of displaying constants as claimed in claim 1, wherein the content of said constant is displayed with an upper and a lower line.

5. The calculating method capable of displaying constants as claimed in claim 1, wherein the content of said constant includes a unit, a symbol, a value and an item number of said constant.

* * * * *